March 20, 1945.  B. E. O'CONNOR  2,371,705
HYDRAULIC SHOCK ABSORBER
Filed April 10, 1942
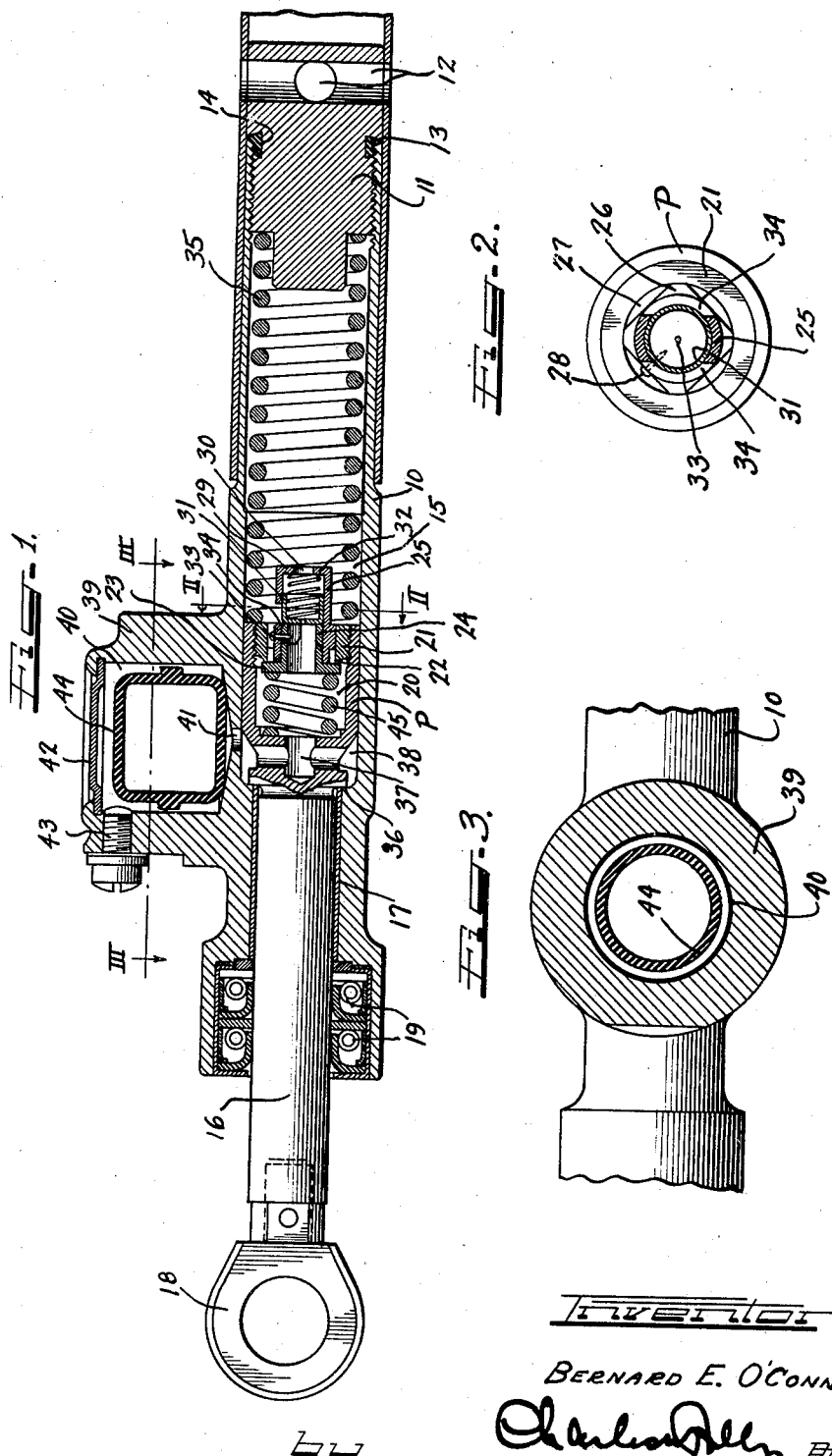
Inventor
BERNARD E. O'CONNOR.
by Charles Allen Attys.

Patented Mar. 20, 1945

2,371,705

UNITED STATES PATENT OFFICE 2,371,705

HYDRAULIC SHOCK ABSORBER

Bernard E. O'Connor, Buffalo, N. Y., assignor to Houdaille-Hershey Corporation, Detroit, Mich., a corporation of Michigan Application April 10, 1942, Serial No. 438,405

1 Claim. (Cl. 188—96)

My invention relates to hydraulic shock absorbers, particularly to the direct acting piston type in which a piston is reciprocal in a cylinder and has a piston rod extending therefrom outwardly through one end of the cylinder. With this type of shock absorber an expansion chamber is usually provided for receiving the hydraulic fluid displaced by the piston rod when the rod is shifted inwardly for movement of the piston in the cylinder. Heretofore such expansion chambers have usually been only partially filled during operation of the shock absorber so that air could mix with the hydraulic fluid to cause bubbles or emulsification.

The important object of my invention is to prevent access of air to the hydraulic fluid in the expansion chamber by excluding all air therefrom and keeping the shock absorber at all times full of fluid.

A further object is to provide an arrangement in which an expansible and contractible closed container full of air or other suitable gas is placed in the expansion chamber which is closed and which, together with the working chambers in the cylinder, is full of hydraulic fluid so that, upon inward travel of the piston and piston rod in the cylinder, the displaced fluid flow into the expansion chamber will contract the container for compression of the air or gas therein proportionate to the volume of fluid forced into the expansion chamber, and which contracted container, upon release of the load on the shock absorbed, will expand and force the hydraulic fluid back into the working chambers in the cylinder.

Referring to the drawing:

Figure 1 is a longitudinal section of a shock absorber;

Figure 2 is an enlarged section of the valve assembly on plane II—II of Figure 1; and Figure 3 is a section on plane III—III of Figure 1.

On the structure shown, the cylinder 10 is internally threaded at its outer end to receive a plug 11 which forms a head and has at its outer end holes or passageways 12 by means of which it may be secured in any suitable manner to structure on which the shock absorber is to be used. To seal this end of the cylinder, a gasket 13 of suitable material is tightly squeezed in the annular recess 14 in the plug.

The cylinder has the bore 15 in which the piston P operates, the piston rod 16 extending through the smaller bore 17 and terminating in an eye 18 for connection with a structure with which the shock absorber is to be used. Suitable packing material 19 in the cylinder head around the piston rod prevents leakage.

The piston P has the bore 20 in the inner end of which is threaded the annular valve seat member 21 terminating in the annular valve seat or edge 22. The seat is engageable by the annular valve disk 23 which has the annular stem 24 extending therefrom into a sleeve 25, this sleeve having the flange 26 fitting in the seat member 21 and slabbed off to provide passageway 27, the valve stem being secured to the sleeve as by means of a pin 28.

The sleeve at its inner end has the cross wall 29 with a port 30, and within the sleeve is the cup valve 31 pressed by a spring 32 with its bottom normally seated against the inner end of the valve stem 24, and in this valve bottom a restricted orifice 33 may be provided. The stem has the passageway 34 in its side normally closed by the cup valve 31.

A shock absorbing spring 35 in the cylinder bore 15 extends between the plug 11 and the inner end of the piston P and tends to hold the piston in its outer position against the shoulder 36. The piston bore 20 is connected through passageways 37 with the space 38 between the outer end of the piston and the inner end of the bore 15.

The cylinder has a lateral extension 39 providing a filling and expansion chamber 40 for displaced hydraulic fluid, this chamber at its inner end being connected through a hole 41 with the space 38 in the cylinder. The chamber 40 is closed by a cover 42, and a filler screw plug 43 allows filling of fluid for the shock absorber cylinder and the chamber 40. Within the chamber is the compensator element 44 in the form of a hollow container of expansible and contractible material, as, for example, rubber or other material having the characteristics of rubber. The container may be of any shape and is entirely closed and filled with air or other suitable gas under pressure greater than that of atmospheric pressure. This pressure may be obtained by filling in fluid into the chamber 40 under pressure which will primarily contract the container 44 for subjection of the contained gas to corresponding compression. After filling of the shock absorber and the chamber 40, the compensator 44 will float to the top of the chamber to expose the hole or passageway 41.

When the shock absorber is subjected to a force tending to shift the piston inwardly in the cylinder bore 15, the spring 35 will resist such movement. If this movement is comparatively slow, the valve 23, whose opening movement is resisted by the comparatively heavy spring 45, will remain closed, and the displaced fluid, resulting from passage of the piston rod into the cylinder bore, will be through the restricting orifice 33 into the piston bore and through passageways 37 in the piston head to the cylinder space 38 behind the piston from where it enters the expansion chamber 40 through the hole 41. As the expansion chamber is already filled with fluid, the displaced fluid will exert its pressure against the compensator 44 for contraction thereof equal to the volume of the displaced fluid. If the inward movement of the piston in the cylinder is comparatively rapid or sudden, the pressure will be sufficient to unseat the valve 23 against the resistance of the spring 45, so that the displaced fluid may flow through the passageways 27 past the unseated valve 23 and into the expansion chamber 40 for contraction of the compensator 44. The valve 23 thus functions as a blow-off valve. If desired, the restricted orifice in the cup valve 31 may be omitted so that the valve 23 forms the sole means for controlling the flow of the displaced fluid from the high pressure side of the cylinder to the low pressure side and into the expansion chamber 40.

When the pressure on the shock absorber is released the spring 35 will shift the piston out to its normal position, the pressure of the fluid at the outer side of the piston then opening the valve 31 against its spring 32 for comparatively free flow of the fluid to the inner end of the cylinder bore. During such outward movement of the piston and its stem, the pressure in the expansion chamber 40 will be relieved and the compensator 44 will correspondingly expand to its original shape and will assist the flow of the fluid from the expansion chamber back into the cylinder. When the fluid expands due to rising temperature, the compensator will be correspondingly contracted and reduced in size, and conversely, when the fluid contracts due to falling temperature, the compensator correspondingly expands because of the initial compression it has been subjected to when the shock absorber was initially filled. The fluid at all times fills all available space in the shock absorber so that all air is excluded, and there consequently can be no bubbles in the fluid or emulsification which would materially interfere with the efficient operation of the shock absorber. By my invention I have thus materially increased the efficiency of shock absorber structures of the type referred to.

I do not desire to be limited to the exact arrangment and operation shown and described, as changes and modifications may be made without departing from the scope of the invention.

I claim as follows:

A hydraulic shock absorber of the direct acting type comprising a cylinder, a piston movable in said cylinder and having a rod extending therefrom to the exterior of the cylinder, valve means controlling the flow of the displaced fluid from one side of the piston to the other, a compensating element in the form of a closed expansible and contractible container filled with compressible and expansible medium, said cylinder being full of hydraulic fluid in which said compensating element is immersed and said hydraulic fluid having been forced into said cylinder when the piston rod is withdrawn and under a pressure sufficiently greater than atmospheric pressure for initial compression and contraction of said compensating element by the fluid when said piston is withdrawn whereby upon contraction and reduction in volume of the fluid in response to maximum anticipated temperature drop said compensating element may expand to compensate for such fluid volume reduction, said compensating element being compressed and contracted beyond its initial compression and contraction when said piston rod moves into the cylinder.

BERNARD E. O'CONNOR.